United States Patent
Allen et al.

(12) 
(10) Patent No.: US 8,221,810 B2
(45) Date of Patent: Jul. 17, 2012

(54) HIGH FIBER SHELF STABLE TOASTER PASTRIES AND METHODS OF PREPARATION

(75) Inventors: Patrick E. Allen, Monticello, MN (US); Dean F. Funk, Brooklyn Park, MN (US); Terry T. Kirihara, Bloomington, MN (US)

(73) Assignee: General Mills IP Holdings II, LLC, Minneapolis, MN (US)

( * ) Notice: Subject to any disclaimer, the term of this patent is extended or adjusted under 35 U.S.C. 154(b) by 329 days.

(21) Appl. No.: 12/606,241

(22) Filed: Oct. 27, 2009

(65) Prior Publication Data

US 2010/0104693 A1 Apr. 29, 2010

Related U.S. Application Data

(60) Provisional application No. 61/108,889, filed on Oct. 28, 2008.

(51) Int. Cl.
*A21D 13/00* (2006.01)

(52) U.S. Cl. .......... 426/94; 426/283; 426/439; 426/496; 426/549; 426/556

(58) Field of Classification Search .................. None
See application file for complete search history.

(56) References Cited

U.S. PATENT DOCUMENTS

| | | |
|---|---|---|
| 4,612,198 A | 9/1986 | Wallin et al. |
| 4,623,542 A | 11/1986 | Wallin et al. |
| 6,267,998 B1 | 7/2001 | Bauman et al. |
| 6,372,281 B1 | 4/2002 | Metzger et al. |
| 6,497,909 B1 | 12/2002 | Metzger |
| 6,592,915 B1 | 7/2003 | Froseth et al. |
| 6,827,958 B2 | 12/2004 | Brown et al. |
| 2003/0124227 A1 | 7/2003 | Brown et al. |
| 2004/0071832 A1 | 4/2004 | Stevens et al. |
| 2005/0084567 A1 | 4/2005 | Brown et al. |
| 2006/0073239 A1* | 4/2006 | Boyle et al. ............ 426/89 |
| 2007/0269569 A1 | 11/2007 | Bashor et al. |

OTHER PUBLICATIONS

Dec. 1962, "Approved Methods of the American Association of Cereal Chemists," *Method 38* "Vital Wheat Gluten".

* cited by examiner

*Primary Examiner* — Lien Tran
(74) *Attorney, Agent, or Firm* — Arlene L. Hornilla; Everett Diederiks

(57) ABSTRACT

Icing coated shelf stable high fiber toaster pastry product or packaged consumer food articles are provided as well as their methods of preparation comprising high levels of a soluble fiber ingredient partitioned between the shell, filling and the icing. The present articles comprise an homogeneous baked chemically leavened soluble fiber fortified pastry dough planar shell forming an interior. The fiber fortified dough includes whole grain wheat flour; salt, chemical leavening, shortening, and ≈1-15% added solid powdered polydextrose and in amounts sufficient to provide a total fiber content of the dough of at least 5%. At least a portion of the chemical leavening is provided by ammonium carbonate and in amounts sufficient to provide the dough with a specific baked volume of 1.5 cc/g or greater. The filling includes a liquid soluble fiber ingredient such as polydextrose. The articles are equivalent to conventional toaster pastries in eating qualities notwithstanding their high levels of total fiber.

21 Claims, No Drawings

HIGH FIBER SHELF STABLE TOASTER PASTRIES AND METHODS OF PREPARATION

CROSS-REFERENCE TO RELATED APPLICATION

This application claims the benefit of priority under 35 U.S.C. 119(e)(1) of a provisional patent application Ser. No. 61/108,889, filed Oct. 28, 2008, which is incorporated herein by reference in its entity.

BACKGROUND OF THE INVENTION

The present invention relates to food products and to their methods of preparation. More particularly, the present invention relates to shelf stable toaster pastries having high levels of fiber and to their methods of preparation Toaster pastries are well known food products. Toaster pastries are products typically intended to be heated in a consumer toaster oven or microwave oven. Toaster pastries are generally in the form of a generally thin or planar rectangular sealed exterior shell fabricated with two sheets each formed from a sweet bread or pastry dough adjoined with a peripheral seal forming an interior cavity. A sweet filling, typically fruit based, is disposed and sealed within the interior cavity.

These pastry products are generally consumed as breakfast or dessert items and are to be distinguished from somewhat similar types of products intended to be a pocket sandwich. Many variations of such sandwiches remain popular that maintain their cultural identity such as calzones (Italian), pasties (Cornish or Finnish), perogies (Eastern European especially Polish). Such pocket sandwich products are made from an unsweetened dough and also are typically three dimensional rather than flat by virtue of the greater amount and type of filling. These pocket sandwiches are formed from a circular piece of dough folded axially to form a semi-circle and sealed along their matched curved edge. The present products are also distinguished from various Mexican products comprising an unsealed filled rolled tortilla such as enchiladas although semi-sealed rolled products having end folds are also known such as burritos. The present products are to be distinguished from such products not only by their different shape but also by virtue of their methods of preparation. Also, such pocket sandwiches are typically prepared and formulated for frozen or at least refrigerated storage and distribution rather than the shelf stable articles of the present invention.

Breakfast or dessert toaster pastries generally can be sub-categorized into either shelf stable or frozen products. Frozen consumer-heatable pastry products that contain sweet fillings are well known and include products such as TOASTER STRUDEL brand pastries sold by The Pillsbury Co., Inc., and the like. These pastry products are sold to the consumer in frozen form for heating by the consumer in a toaster or microwave oven. Typically, the pastries comprise a fried laminated dough shell or "pastry" and further comprise a sweet filing such as a fruit or spice flavored jelly, for example, cherry, cinnamon, apple, and the like disposed within the pastry shell. In many instances they often also include icing that can be pre-applied or applied by the consumer after reheating the pastry product. A good description of such products is given in U.S. Pat. No. 4,612,198 "High Stability, High Flavor, Breakfast Pastry And Method For Preparing The Same" issued Sep. 16, 1986 to Wallin et al. (See also U.S. Pat. No. 4,623,542 "High Stability, High Flavor, Breakfast Pastry And Method For Preparing The Same" issued Nov. 18, 1986 also to Wallin et al. or U.S. Pat. No. 6,827,958 "TOASTER PASTRY" issued Dec. 7, 2004 to Brown et al.)

Typically, consumer re-heatable pastry products are low in fiber, for example, containing less than ≈1 gram of fiber per 54 gram serving. Improved, high fiber toaster pastries are described in U.S. Ser. No. 61/126,122 "High Fiber Pastry Product" filed May 1, 2008 by Bashor et al. By distributing insoluble and soluble fiber constituents among the pastry dough, filling and topical icing, high levels of total fiber can be realized. In preferred embodiments, the pastry products are fried and adapted for frozen distribution in sale.

Shelf stable toaster pastries are also well known since the 1960's and now especially those available under the Pop-Tarts brand. Such Pop-Tarts brand toaster pastries are a flat rectangular toaster pastry approximately 3 in. (75 mm) by 5.5 in. (115 mm), made by the Kellogg Company. Pop-Tarts toaster pastries have a sugary filling sealed inside two layers of rectangular, thin pastry crust; each layer of this crust is ≈0.1 in. (2 mm) thick. Most varieties have frosting, but some do not. They can be eaten without being warmed, but are often warmed inside a toaster. They are usually sold in pairs inside foil packages, and do not require refrigeration. Improved multi-layered toaster pastries have also been developed (See, for example, U.S. Pat. No. 6,267,998 "Multi-Layer Toaster Product and Method for Making Same" issued Jul. 31, 2001 to Bauman et al.). Shelf stable products while often physically resembling frozen toaster pastries in size, shape and appearance, differ substantially in formulation and method of preparation. For example, frozen toaster pastries typically comprise a shell fabricated from a fried laminated dough. In contrast, shelf stable products typically comprise shells fabricated from chemically leavened baked un-laminated dough. Also, the fillings of frozen toaster pastries generally are higher in moisture content and quantity than in the lower water activity shelf stable toaster pastries.

The present invention provides an improvement upon such shelf stable toaster pastries by providing high fiber, including added soluble fiber, shelf stable toaster pastries.

One problem with adding fiber, particularly added soluble fiber is that adding such ingredients can result in insufficient leavening of the dough shell upon baking resulting in a finished product having unacceptable mechanical and/or organoleptic properties. The present invention resides in part in that, surprisingly by selecting a particular leavening system involving particular leavening acids, that such problems can be overcome and acceptable finished products realized that provide both desired nutritional and eating qualities.

Also surprisingly, the particular physical form of the added ingredient has been found to be important when added to a particular product (i.e., when added to the shell or pie; when added to the jam or filling; or when added to the icing) to the realization of both desired nutritional and eating qualities.

BRIEF SUMMARY OF THE INVENTION

In its product aspect, the present invention reside in shelf stable high fiber toaster pastry product or packaged consumer food articles. The present articles comprise a baked chemically leavened soluble fiber fortified pastry dough planar shell formed from two opposed similarly sized thin baked leavened upper first and lower second dough sheets or layers spaced slightly apart and sealed together along their adjoining free edges or peripheral margins forming an interior. The fiber fortified dough includes whole grain wheat flour; salt, chemical leavening, shortening, and ≈1-15% added solid powdered polydextrose and in amounts sufficient to provide a total fiber content of the dough of at least 5%. At least a portion of the chemical leavening is provided by ammonium carbonate and in amounts sufficient to provide the dough with a specific baked volume of 1.5 cc/g or greater. The baked dough water activity is 0.70 or less.

The present articles can further comprise a soluble fiber fortified filling layer form disposed within the interior pocket formed by the shell a between said first layer and said second layers. The filling composition can comprise an added liquid soluble fiber source selected from the group consisting of inulin, polydextrose, hydrolyzed guar gum and mixtures thereof and the filling soluble fiber source is present in amounts sufficient to provide the filling with a soluble fiber content of at least 8%. The soluble filling has a water activity of 0.70 or less. The weight ratio of shell to filling ranges from ≈1.5:1 to ≈2.5:1.

In its method of preparation aspect, the present invention includes method of preparing a toaster pastry, comprising the steps of:

forming a continuous thin layer of sheeted dough fabricated from a chemically leavened dough wherein at least a majority portion of the leavening includes ammonium bicarbonate fortified with sufficient amounts of a solid soluble fiber ingredient to provide the dough with a total fiber content of 8% or greater, said dough having a moisture content of 10-20% and a water activity of 0.85 or less;

applying or depositing a filling layer onto an interior portion or half of the dough layer to form a filled dough layer portion and an unfilled dough layer portion, said filling layer comprising sufficient amounts of liquid soluble to provide the filling with a soluble fiber content of 1-35% and having a viscosity during application of 14,000 cps or less and having a water activity of about 0.75 or less;

folding the unfilled dough layer portion over filled portion to form matched and aligned upper and lower dough layers shell portions forming a dough shell having an inner pocket and a filling layer disposed within the inner pocket, said shell having open free edges;

sealing the open free edges of the shell to form an encasing dough pie shell having a filler layer and an upper top layer and a lower bottom layer;

providing a multiplicity of docking holes in the upper top layer for moisture escape during baking; and, baking the pie shell to form a finished high fiber expanded toaster pastry article.

DETAILED DESCRIPTION OF THE INVENTION

The present invention provides high fiber shelf stable toaster pastries comprising a shell or pie fabricated from a fiber-fortified dough and a fiber-fortified filling disposed within the shell to provide a shelf stable finished product having at least 10% total fiber. Each of these components as well as product properties, preparation and use are described in detail below.

Throughout the specification and claims, percentages are by weight and temperatures in degrees Centigrade unless otherwise indicated. Each of the referenced patents is incorporated herein by reference.

Shell

The present fiber fortified toaster pastries can include a shell fabricated from a fiber fortified baked "pie" prepared from a chemically leavened low-fat farinaceous sheeted uniform (i.e., non-laminated) dough sheet. In the art, a toaster pastry's shell is often colloquially referred to as a "pie" while the filling is often referred to as the "jam". The finished good is often simply referred to as a "tart". In contrast, a laminated dough shell of a strudel type of toaster pastry is often colloquially referred to as "the pastry". The pie or pastry shell comprising a single homogeneous layer of a structural dough selected from the group consisting essentially of a sheeted pastry and having a sugar content of from 2.0 to 10.0% dough, a bread dough, a bagel dough, a pizza crust dough, a pita bread dough, a cracker dough, a graham cracker dough, and a pie crust dough. In preferred form, the dough is provided by a pastry dough.

In preferred form, the shell is in the form of a square or preferably a rectangle. For example, conveniently, the length to width ratio of the finished dimensions of a toaster pastry can range from ≈1:1 to ≈3:1, preferably ≈1.25-2.0:1 and for best results ≈1.4:1 (e.g., ≈105 mm in length and ≈75 mm in width.).

The shell can be formed from two opposed similarly sized thin baked leavened upper first and lower second dough sheets or layers spaced slightly apart and sealed together along their adjoining free edges or a plurality of peripheral margins to form or define and interior cavity. In one preferred variation, a single square or rectangular dough sheet is folded in half to form the opposed pair of matching shell layers. The common fold line is typically longitudinally extending to form one sealed free edge. The remaining three free edges are sealed together such as by crimping or docking prior to baking. In less preferred variations, a circular or even elliptical dough sheet is employed and folded upon itself and sealed to form the shell.

The finished baked dough sheets of the tart are each thin and generally will have a thickness of ≈1-5 mm, preferably ≈3-4 mm. The unbaked chemically leavened raw dough sheets from which the shells are made generally have thickness of roughly ½ of the finished baked leavened layer's thickness.

Frequently, at least one baked dough sheet includes a multiplicity of docking holes or perforations to allow steam or moisture escape during the below described baking step to prevent excessive pillowing of the interior cavity to form a pocket. Such pillowing is undesirable since the desirable planar structure of the product can be lost leading to difficulty in warming in a toaster oven (due to excessive thickness), increasing product fragility and difficulty in handling especially during consumption. In preferred form the top sheet includes the docking feature and in more preferred form only the top sheet includes the docking feature, i.e., the bottom or lower sheet is imperforate.

The pie shell further includes a plurality of peripheral margins of said first layer to said plurality of peripheral margins of said second layer to form a leak-proof seal between said first and said second layers forming a pocket within which the filling layer is disposed.

While bread doughs can be employed, in preferred form, the sheeted pastry dough is undeveloped. By undeveloped herein is meant that the dough has not been worked such as how bread doughs are prepared to provide a dough characterized by a developed gluten structure. Also, in preferred form the pastry dough is uniform or homogeneous and thus is to be distinguished from the laminated structure of a strudel dough.

The baked dough comprising the first layer should have suitable structural characteristics to resist breaking and/or distorting during manufacturing, packaging, shipping, and final toasting during consumer use. The first layer must be strong enough to support any filling layer. The first or pie shell layer must withstand the heating process in the toaster as it sits in the toaster on its edge. It must also be strong enough to support itself, and the filling layer as the multi-layer product is held at an edge as it is removed from the toaster.

The present dough compositions comprise from ≈15 to 70% (dry weight basis of the dough, i.e., before added moisture from liquid ingredients) as flour. Conventionally, flour is standardized to a moisture content of ≈14% and the present ingredient ranges for flour include such moisture. Flours useful herein are of a conventional type and quality including cake flour, bread flour, and all-purpose flour. Wheat flours are preferred but other flours conventionally used in the preparation of baked goods are also employed in full or partial substitution for the wheat flour. Traditional cake flour used for layer cakes has ≈8% or less protein by weight of the flour. Pastry flour ordinarily has a protein level of ≈10%. Other flours such as bread flour generally have a higher protein level of ≈11 to 13% by weight. One protein range for wheat flour used in the present invention is between ≈9 to 10% by weight of the flour. A general all-purpose flour can also be used. All-purpose flour generally comprises a mixture of both and hard and soft wheat flours, i.e., both high protein level and low protein level flours. Such flours are useful if the average protein content ranges from ≈8 to 10% by weight. In more preferred variations, the flour can comprise ≈40-60% and for best results ≈48-52% of the dough from which dough sheet 12 is fabricated.

In a highly preferred embodiment, a whole wheat flour is used in whole or in part for the flour ingredient. As part of the benefit of providing nutritional benefits of whole grains, the whole wheat flour can provide high levels of native fiber. Wheat comprises a major starchy endosperm, a smaller germ or sprouting section of the seed and a surrounding bran or husk layer. The "endosperm" is the portion typically referred to, upon milling, as "flour" and generally makes up 81-85% of the wheat kernel. Bran makes up ≈11-15% of the kernel, with ≈1% to 3.5% being the germ portion. Thus, whole wheat have a native fiber content from its bran layer constituent that typically ranges from ≈7-14% depending upon such factors as wheat variety, crop year variations, handling, etc.

In highly preferred embodiments, the whole grain wheat is provided by an extra fine hard white spring wheat flour, Kansas Diamond, available from Archer Daniels Midland or Ultragrain from ConAgra. Such a whole-grain white wheat flour is surprisingly superior in providing shelf stability and better texture than whole grain wheat flours of red wheats that can impart an undesirable bitter flavor to the pie shell. In other variations, all or a portion of the whole grain wheat flour can be provided by the white wheat flours such as are described in U.S. Pat. No. 6,372,281 "Process Of Milling Hard White Wheat And Products" issued Apr. 16, 2002 to Metzger et al. or U.S. Pat. No. 6,497,909 "Method Of Bleaching Cereal Grain" issued Dec. 24, 2002 to Metzger.

In one embodiment, a portion of the whole wheat flour can be replaced by vital wheat gluten. In many embodiments, the high fiber-containing toaster pastry products of the invention can be prepared from a dough composition that comprises vital wheat gluten. Vital wheat gluten replaces at least a portion of the protein that is lost in the dough compositions due to the reduction of the amount of wheat flour used. Vital wheat gluten refers to the dried, insoluble gluten portion of wheat flour from which the starch and soluble components have been removed by a washing process. Typically, the vital wheat gluten is then dried to a fine powdered state. Vital wheat gluten is typically not denatured as determined by the test procedure in "Approved Methods of the American Association of Cereal Chemist", Method 38 entitled "Vital Wheat Gluten" (December 1962). Vital wheat gluten typically has a percent protein on a dry basis of ≈75% or greater. Useful vital wheat gluten is commercially available under the trade designation PROVIM ESP (from Archer Daniels Midland Co., IA). Typically, the amount of vital wheat gluten in the dough composition ranges from ≈1-5% wt., or from ≈1.5-4% wt.

The dough compositions of the present invention also can comprise 0-15% of a nutritive carbohydrate sweetener, preferably ≈5-10. Typically, sucrose is used in mixes for baked goods as the sugar ingredient, although up to ≈30% of the sugar in the present invention food products is supplied by corn syrup or corn syrup solids or other nutritive carbohydrate sweetening agents such as dextrose, maltose, fructose, lactose, brown and invert sugars, alone or in combination. Commercially available milled sugar usually contains up to ≈4% starch as an aid to maintaining its free-flowing properties.

The dough can additionally comprise from ≈0 to 25% of an edible fat or shortening ingredient. A shortening ingredient adds richness to the eating properties of the finished baked goods as well as aids in the leavening process. In more preferred formulations, the dough and pie shell fabricated therefrom are characterized as being low fat and the shortening ingredient can comprise ≈2-15%, preferably ≈8-12% shortening.

Conventional shortening materials are suitable for use as the shortening ingredient of the present doughs. Such conventional shortening materials are well known in the dough art. The conventional shortenings useful herein include fatty glyceridic materials classified on the basis of their physical state at room temperature. Liquid shortenings or oils are usable and provide an advantage of ease or incorporation. Solid shortening is usable and provides an advantage of desirable mouthfeel upon consumption of the baked good. More commonly used are mixtures of liquid and solid shortenings. These mixtures are fluid or plastic depending, in part, on the level of solid fatty materials. Shortenings of this type comprise a liquid oil containing from ≈2-26% normally solid fatty glycerides. This percentage corresponds to a solid content index, "SFI", at 70 and 4% to 6% at 100° F.

Solid fatty glycerides include fatty monoglycerides and diglycerides of saturated fatty acids having 16-22 carbon atoms. The liquid shortening is animal shortening, marine fats, vegetable or synthetic oil, such as sucrose polyesters, which are liquid at ordinary room temperature. Representative of such liquid shortenings include coconut oil, palm kernel oil, cottonseed oil, peanut oil, olive oil, sunflower seed oil, sesame seed oil, corn oil, safflower oil, poppyseed oil, soybean oil, canola (rapeseed) oil, babassue oil and the like. Other suitable shortening materials and methods of shortening preparation are described in detail in Bailey "Industrial Oil and Fat Products," (3rd ed. 1964) which is incorporated herein by reference.

Mixtures of the above oils are usable as are solid fatty materials, such as saturated triglyceride fats. In general, from ≈1.5 to 25% triglycerides which are solid at 70° F. are added to a liquid oil.

For certain embodiments, the preferred oils are soybean oil hydrogenated to an iodine value (IV) of from ≈105 to 115, preferably ≈107, corn oil, palm oil, hydrogenated palm oil, lard and tallow oils. Preferably, the oils used to prepare the shortening composition will contain only from ≈1-7% hardstock. Hardstock is a hydrogenated triglyceride having an iodine value of 8 or less. Preferred hardstocks include hydrogenated soybean oil, hydrogenated cottonseed oil, hydrogenated palm oil and hydrogenated lard or tallow.

Some embodiments of the doughs of the present invention can further comprise ≈1-5% of emulsifiers. The shortening provides a convenient carrier for addition of emulsifiers to the dough. The emulsifiers aid the realization of baked goods with improved grain structure and texture. The emulsifiers are also useful to maintain the emulsion integrity of the dough over extended room temperature storage.

The emulsifier typically comprises from ≈1 to 20% of the shortening component, preferably ≈5 to 15% and, in some embodiments, from ≈10 to 15%. Emulsifiers can be prehydrated in an aqueous dispersion and added to the dough. The emulsifiers in other embodiments are part of an emulsion or dispersion with or without a fat component. Generally useful as emulsifier components of the shortening ingredient are partially esterified polyhydric compounds having surface active properties. This class of emulsifiers includes among others, mono and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulphuric acid esters, such as dodecylglyceryl ether sulfate and monostearin phosphate. Other examples include the partial esters of hydroxy carboxylic acid such as lactic, citric, and tartaric acids with polyhydric compounds, for example, glycerol lacto palmitate and the polyoxyethylene ethers of fatty esters of polyhydric alcohols, such as polyoxyethylene ether of sorbitan monostearate or distearate. Fatty acids alone or esterified with a hydroxy carboxylic acid, e.g., stearyl-2-lactylate are also useful.

In certain variations, all or a portion of the emulsifier component is preblended with the shortening or fat component. However, in other variations, a portion of the emulsifiers can be prehydrated and added along with the other wet ingredients. In still other variations, the emulsifiers can be plated onto various solid carriers such as flour, starch, sugars, milk powders, and the like, and admixed in with the various dry ingredients.

The present doughs are preferably not acidified and thus range in pH from ≈6.5 to 8.0.

The dough formulations can additionally and preferably include salt as a flavor ingredient. Good results are obtained when the salt addition ranges from ≈0.1-4%, preferably ≈0.5%-2% and for best results ≈0.5-1%.

In preferred embodiments, the food articles of the present invention comprise an anti-mycotic ingredient such as sodium, potassium sorbate, calcium propionate, parabens, or propionic acid. While not needed to maintain shelf stability addition of such anti-mycotic ingredients so desired from a food safety standpoint anti-mycotic in case the physical integrity of the food product is comprised and compromised and oxygen leaks into the head space. Concentration ranges for calcium propionate from (0% to 0.2%) or while parabens concentration ranges from 0-0.1%.

The present dough formulations additionally contain sufficient amounts of an added fiber ingredient to provide the dough with a total fiber content ranging from ≈5-15%, preferably ≈8-12%. In preferred form, at least a portion of the added fiber is a source of soluble fiber. More preferably, a soluble fiber ingredient is added in ≈1-15%, preferably ≈5-10%. Suitable soluble fibers include, for example, polydextrose, maltodextrins, resistant maltodextrins, inulin, guar gum, carbomethyl cellulose, high methoxy pectin, and the like as well as mixtures thereof.

The preferred soluble fiber is polydextrose. Employment of polydextrose as the soluble fiber source provides unexpected advantages in the present articles over a generally considered substitute material, inulin. Inulin can degrade or decay over extended period of shelf storage. As a result, the fiber content of articles upon consumption after extended storage can be reduced, and by unknown percentages due to such degradation. While such degradation can be anticipated and over fortification provided to compensate for such anticipated degradation, inulin is an expensive ingredient and is currently under tight supply. Also, for reasons that are unclear, other soluble fiber ingredient materials, especially inulin, appear to adversely interact with the essential ammonium carbonate leavening ingredient herein and can lead to not only to loss of fiber but also to undesirable flavors development and insufficient leavening.

Still another problem in commercial production of the present articles is that the present pastry dough is difficult to sheet to the desired thicknesses. When other fiber materials are employed to provide added fiber, including added soluble fiber, the pastry dough commercial handling problems are aggravated. Higher water addition, a typical technique to overcome such dough handling problems, cannot be used since the dough tends to resist moisture release in the short bake times allowed by the thin pie shells especially in high fiber executions. Surprisingly, employment of polydextrose as or principle or preferably the sole added soluble fiber ingredient provides unexpected stability, flavor, cost and dough handling advantages.

In one highly preferred form, the soluble fiber ingredient is added to the dough formulation in the form of a dry powder. Addition of the soluble fiber ingredients in dry form in contrast to a liquid or aqueous form surprisingly beneficially aids in providing a sufficiently leavened finished baked pastry shell element. Addition of soluble fiber in solid form, especially polydextrose, can be conveniently practiced by admixture of the solid polydextrose to other dry ingredients to form a solid pre-blend of dry ingredients. Also, as noted above, the present pastry doughs are formulated using minimal moisture addition to provide desired finished baked moisture levels to provide the desired extended shelf stability attributes of the present articles. Thus, it is surprisingly desirable to added the polydextrose to the dough formulation in solid form rather than in liquid form.

The doughs herein are desirably chemically leavened to provide a modestly expanded finished baked pastry dough layer. The finished baked pastry dough layer is characterized by a specific baked volume of ≈1.5-2.5 cc/g and the present dough formulations contain sufficient amounts of a chemical leavening system to provide such finished specific baked volume values. However, provision of a suitable chemical leavening system employing a heat activated leavening acid and conventional baking soda is surprisingly difficult in such a baked pastry layer having the present high levels of native fiber (from whole grain wheat flour) and fortified with added soluble fiber to the levels herein. Surprisingly, however, the difficulties in providing chemical leavening sufficient to provide the specific baked volume values needed to provide the desired eating qualities of a high quality toaster pastry have been overcome by the present invention. To overcome these difficulties and provide the finished baked toaster pastry shell with the desired leavening, the present doughs can be formulated to include ammonium carbonate as a chemical leavening ingredient. Good results are obtained when the ammonium carbonate is employed at ingredient levels ranging from ≈0.2-0.5%, preferably ≈0.3-0.4%. For balancing the flavor of the ammonium carbonate, low levels e.g., less than 0.1% of sodium carbonate can also be employed in addition to the ammonium carbonate.

The doughs of the present invention have a total moisture content of 10% to 20% prior to baking. The total moisture includes water provided with or associated with the various essential and optional ingredients. For example, total moisture includes the moisture associated with flour, starch, flavorings such as cinnamon and especially liquid eggs. The total moisture is determined by a vacuum oven drying of the doughs herein. In certain preferred embodiments, no added water is employed to formulate the present doughs. Moisture is provided in pasteurized liquid eggs and the residual moisture associated with the dry ingredients.

The particular selection of ingredients and concentration are selected to provide doughs sheets that while having a water activity of ≈0.85 before baking have a water activity after baking that is less than 0.70. For some embodiments, the water activity after baking is 0.67 or less. Selection of such water activity value is important in achieving a balance between microbial shelf stability and dough handling characteristics. Water activity is using limited water as described above to make the dough and by having salt, or sugar in the dough. The finish moisture content of the pastry shell generally ranges 2-8%.

Filling

The present toaster pastry articles further comprise a filling layer form disposed within the interior pocket formed by the shell a between said first layer and said second layers. In preferred form, the thickness of the filling layers is thin and can range from ≈1-4 mm, preferably ≈2-3 mm in thickness. The filling can be supplied by fruit fillings, chocolate fillings, confectionery or sweet fillings, and non-sweet or savory fillings. Since fruit fillings are the most popular, particular reference is made herein to a jam layer of fruit filling. However, the skilled artisan will appreciate that the present invention can be practiced in connection with a wide variety of fillings.

Any fruit based composition of requisite water activity value can be used herein to preferred fruit fillings are selected from the group consisting essentially of strawberry, apple, cherry, pineapple, orange, raspberry, apricot, grape, blueberry, peach, lemon, mango, and blends thereof. Confectionery fillings include caramel, chocolate, brown sugar, cinnamon and vanilla cream. Chocolate fillings can be supplied by chocolate per se, chocolate flavored compound fat fillings or blends thereof, both. Both dark chocolate and milk chocolate are contemplated as well as both sweetened and unsweetened. Non-sweet fillings are selected from the group consisting of nuts, nut analogs, cheese, cheese analogs, egg, meats, meat analogs, nuts or nut buffers, vegetables such as cheese, and blends thereof.

In highly preferred embodiments, the filling is also fortified with added fiber especially soluble fiber such as such highly concentrated sources of soluble fiber such as hydrolyzed guar gum or pectin or especially inulin and/or polydextrose. In more preferred form, the source of soluble fiber itself is water soluble. Thus, those materials such as isolated beta glucans from barley and oat bran that are not entirely water soluble are not preferred for use herein. In the preferred embodiment, the soluble fiber is provided in liquid form as an aqueous solution of the soluble fiber.

In many embodiments, the present high fiber toaster pastry products include a fiber fortified sweet filling that is a sweetened fruit filling. Good results can be obtained with fiber fortification of those shelf stable fruit filling compositions described in, for example, U.S. Pat. No. 6,592,915 "Layered Cereal Bars And Their Methods Of Manufacture" issued Jul. 15, 2003 to Froseth et al. Generally, such fruit filling formulations as more completely described therein comprise a sweetened fruit preparation of fruit materials and added nutritive carbohydrate sweeteners that often includes a thickener in addition as well one or more supplemental ingredients to enhance the color, taste, texture, nutrition, shelf stability or other properties of the filling. In those variations where cost reduction is an important consideration, the fillings can be merely fruit flavored rather than fruit material bearing since fruit materials are typically more expensive than the commonly used nutritive carbohydrate sweeteners sucrose, corn syrup, dextrose, maltose and mixtures thereof.

The filling formulation can additionally comprise an ingredient to adjust the water activity of the filling to provide water activity values that provide the desired shelf stability properties of the finished baked articles herein. Suitable materials include common sugar alcohols used for such purposes including glycerin, sorbitol, polyglycerol esters, and mixtures thereof.

It has been found surprisingly desirable that the added fiber material be added in a concentrated aqueous form rather than a solid form to the present filling preparation (e.g., ≈50-85% solution, preferably ≈70%). This preferred liquid form for addition to the filling preparation is in direct contrast to the preferred solid form for the soluble fiber ingredient for inclusion into the pie or shell dough formulation. Surprisingly, addition of the fiber to the filling in solid form can undesirably result in a filling having un-dissolved dry fiber notwithstanding vigorous extended mixing leading to a gritty texture. Also, moisture management is very important in providing a finished baked product having both shelf stability and the desired textural qualities upon ultimate consumption. Thus, supplemental moisture addition to the filing to facilitate dissolution of added soluble fiber added in dry form is to be avoided since such moisture addition can adversely affect texture and shelf stability. Good results are obtained when the added soluble fiber ranges from ≈1-35% of the filling formulation, preferably ≈5-15% and for best results ≈5-10%.

An illustrative useful formation is:

| Ingredient | % | Preferred % |
|---|---|---|
| Corn syrup (63DE) | 40-60 | 45 |
| Polydextrose (as a 70% aqueous solution) | 1-20 | 5-15 |
| Corn starch, pre gelatinized | 0.1-5 | 1-3 |
| Acidulants (e.g., citric, malic acid) | 0.1-1 | 0.5-1 |
| Modified corn starch | 0.1-7 | 2-6 |
| Salt | 0.05-0.5 | 0.05-0.1 |
| Glycerin | 0.1-10 | 2-7 |
| Grape juice, white (63° Brix) | 0.1-10 | 1-5 |
| Corn syrup (e.g., high fructose) | 20-40 | 25-35 |
| Colors, flavors | | |

In certain preferred embodiments, the fruit filling can be those fruit based filling materials that are described in U.S. Ser. No. 61/126,122 "High Fiber Pastry Products" filed May 1, 2008 to Michael Bashor (attorney docket GMI 7089).

The useful fiber fortified sweet filing therein described can comprise a fruit or flavored jelly, for example, cherry, cinnamon, apple, and the like. Useful sweet filling compositions comprise sugar, sweeteners, starch, gum blends such as guar and locust bean gum, acidulants, flavors, food color, and preservatives. Also included is a source of dietary fiber that is selected from inulin, polydextrose, and mixture thereof.

Useful filling compositions comprise an amount of fiber (inulin, polydextrose, etc.) sufficient to provide ≈2-5 grams of fiber in a serving of filling of ≈13 grams. For example, the sweet filling can comprise ≈15-38% wt. fiber, or ≈23-30% wt. fiber.

The filling is formulated such that after baking the filing will have a water activity of 0.70 or less, preferably 0.6 or less. Generally, good results are obtained when the pre-baking water activity is about 0.75 or less, preferably about 0.7 whereby upon baking the finished water activity of the filling layer is 0.67 and more preferably 0.6 as noted above.

Generally, the weight ratio of the shell to filling is ≈2:1.

Confectionery Icing, Frosting

In many embodiments the high fiber pastry products of the invention can additionally include an icing component that can be pre-applied to the pastry product or can be provided in a separate container for application to the pastry by the consumer. In a preferred embodiment, the icing is applied only to one major surface especially the top surface having docking holes or apertures for moisture release upon baking.

Since the toaster pastry articles are typically re-warmed in a toaster in a vertical orientation, the icing formulation is formulated so as to stay in place and to not melt or soften or drip upon toaster warming. Also, the icing is formulated to accommodate that the icing is typically applied to the toaster pastries after completion of the baking step without an intervening cooling step.

The icing layer generally comprises a nutritive carbohydrate sweetener as its principle ingredient especially corn syrup as the principle carbohydrate nutritive. The icing also can include a structuring ingredient such as gelatin and/or a whipping protein especially a soy protein isolate. In other variations, the icing compositions can comprise sugar, fat, water, high potency sweeteners, flavoring, dairy components such as sweet whey solids, xanthan gum, dextrose, and the like.

In one variation, the icing can also contain or be fortified with a water soluble fiber ingredient to provide additional fiber content. The icing can be fortified with and include a source of soluble dietary fiber especially polydextrose, inulin and mixtures thereof. Thus, in certain variations, the fiber addition can be partitioned among the pie shell, the filing and/or the icing. Such partitioning of the fiber addition facilities formulation inasmuch as the formulation for a particular article element does not thus be required to bear the full measure of fiber fortification and any resultant side effects of such fiber fortification on properties such as taste, texture, stability, specific baked volume, etc.

One representative example of a high fiber icing is described in U.S. Patent Application No. 2007/0269569 (Bashor et al.). The high fiber icing composition comprises ≠10-15% wt. inulin; about ≈30-55% wt. sugar; ≈0.009-0.027% wt. xanthan gum; ≈8-20% wt. water; and ≈12-20% wt. total fat. Other ingredients include, for example, corn syrup solids, salt, high fructose corn syrup, flavoring (e.g., vanilla), and an emulsifier such as polysorbate 60.

In another formulation, the icing can be a simple sucrose or sugar icing thickened with a thickener such as gelatin. In other variations, the icing can be flavored. For example, if the filling layer is a chocolate filling, then the icing layer can comprise a chocolate icing. If the filling is a strawberry filing, then the icing can be strawberry flavored and/or pink in color.

Useful fiber-containing icing compositions typically comprise an amount of fiber (inulin, polydextrose, etc.) sufficient to provide ≈1 gram of fiber in a serving of icing of ≈6.5 grams. For example, the icing can comprise ≈10-20% wt. fiber, or ≈12-17% wt. fiber.

It is an advantage of the present invention that such soluble fiber ingredients such as polydextrose and/or inulin not only provide the benefits of added soluble fiber but also that such materials mimic the sugar(s) ingredients with which icing formulations are prepared.

Useful filling compositions comprise an amount of fiber (inulin, polydextrose, etc.) sufficient to provide ≈2-5 grams of fiber in a serving of filling of ≈13 grams. For example, the sweet filling can comprise ≈15-38% wt. fiber, or ≈23-30% wt. fiber.

In one preferred embodiment that includes an icing component, the toaster pastry article, the shell portion or element comprises ≈60-65% of the article weight. The filling portion or element comprises ≈25-35%. The icing can comprise ≈5-10% of the article. The article weight can range from 40-75 g; preferably ≈45-65 g; most preferably ≈50-55 g.

In another variation, the filled toaster pastry can be provided in a pastry kit that also includes a topping composition. The topping composition can be prepared from a variety of materials such as diary-based ingredients, icing, fruit, meat, tomato-based sauces, peanut butter, decorative sprinkles, and combinations thereof for application by the consumer after reheating in the toaster.

Method of Preparation

Generally, the multi-layer toaster product of the present invention can be made by first forming a continuous thin layer of structural sheeted dough suitable for the pastry shell layers. The methods then comprise a step of applying or depositing a filling layer onto an interior portion or half of the dough layer. The filled dough layer can then be folded over the filled portion to form matched and aligned upper and lower pie shell portions and the open edges sealed to form an encasing dough pie shell. The upper dough layer of the pie shell can be docked to provide a multiplicity of holes for moisture escape during and the methods also include a baking step to bake the pie shell to form an expanded toaster pastry shell in the finished article. If desired, the method can further include applying an icing to the top pie shell portion or layer. Once formed the present articles can then be packaged in suitable food packaging such as pouches fabricated from flexible packaging films.

In practicing the dough layer forming step, the sheeted dough can be formed from a uniform structural dough selected from the group such as a bread dough, a bagel dough, a pizza crust dough, a pita bread dough, a cracker dough, a graham cracker dough, a pie crust dough, and in the preferred embodiment, a pastry dough. As noted above, in preferred variations, the toaster pastry shell is prepared from a low fat homogeneous chemically leaved pastry dough.

The raw dough is mixed to form a batter or dough and can be sheeted to form ribbons of desired width and thickness by successive passes through a rolling apparatus. Typically, the first structural layer is formed by successively reducing a sheeted pastry dough to a desired thickness. The continuous layer of sheeted dough can include margins for a filling. In one variation, a prepared dough mass is formed into a sheet using a three roll pass thickness reduction operation. As the dough mass is passed through a first roll, a dough sheet having a sheet thickness of ≈1 inch (25 mm) is formed. Thereafter, this sheet is further reduced in thickness in a second roll pass or thickness reduction sub-step to provide a sheet or ribbon of dough having a thickness of ≈¼ in. (5-7 mm). Finally, a third pass thickness reduction sub-step is practiced in a third thickness reduction roll step to provide a dough sheet having a thickness of ≈0.080 in. (2 mm). The pastry dough can be docked in a pattern that upon subsequent cutting and folding provides the top dough surface with docking holes for venting or release of moisture from the filling during the baking step, followed by slitting to a desired width, and depositing of the sweet filling After the toaster pastry dough is prepared it is filled with the filling and is folded to form an encasing shell. This step can be referred to as "make up." The present method of preparation thus can comprise a step of depositing a non-dough filling layer selected from the group consisting essentially of fruit fillings, chocolate fillings, confectionery fillings and non-sweet fillings between said first dough layer and the second layer dough layer. In practice, a rectangular dough piece can be formed and the filling is applied to an interior portion of ½ of the dough piece in the form of a thin film. Importantly, the filling is formulated to have a thin spreadable consistency at filling temperatures. Good results are obtained when the filling is a gel-able composition having a viscosity of 14,000 cps. or less at filling temperatures. The dough piece is then folded in half such that un-coated portion and having the docking holes overlays the filling and the coated portion of the dough. The sides can then be crimped to form a peripheral or margin seal that defines and interior pocket within which the filling is disposed. A water spray can be applied along the edges of the dough sheet before folding such that good effective sealing and seam integrity are achieved upon crimping and seal formation.

The layers of filling and/or particulate matter disposed on the first layer are preferably spaced away from the edges of margins of the first layer. This is necessary in order to prevent filling and/or particulate matter from being disposed within the region of the toaster pastry which forms the peripheral seal. Should filling or particulate matter be disposed within the seal between the second and the first layers, the potential for leakage of the contents of the toaster pastry is increased. Accordingly, the filling and/or particulate matter must be carefully disposed onto the first layer such that a zone which is free of both filling and/or particulate matter is established. This zone will later be mated to the second layer and a leak-free seal formed therebetween. The particulate matter can be disposed in any suitable pattern.

The formation of a leak-proof seal between the second and first layers is essential in the manufacture of a suitable toaster product. Free edges of the product can be finished by, for example, crimping. The folded edge can be crimped to provide all edges with a similar appearance. After crimping, a laminated dough pad having discrete and continuous upper and lower shell layers, which completely surrounds the filling, is formed. Preferably, the binding of the first and the second layers is accomplished by crimping, rolling, or stamping techniques well known to those skilled in the art.

The folders and crimpers used in the baking industry are well known. With respect to the product of the type described herein, the pastry dough pad is folded upon itself, laying down the top dough layer after depositing the sweet filling on the bottom dough layer. Folding can be accomplished manually or using mechanical implements such as a dough plow.

The present methods can include a step of cooking said multi-layer toaster to form a finished cooked article. The formed but raw toaster pastry product can be then fried or, preferably, baked at an appropriate temperature and is then cooled and packaged.

In preferred form, the product is baked such as in a band oven at 350° F. for ≈10-14 minutes. During the baking step, the chemical leavening in the dough is activated by heat causing an increase in specific baked volume in both dough shell layers on the order of ≈50-100%. Some moisture is evolved as steam especially from the internal filling layer. The docking holes allow for release or escape of the generated steam moisture that prevents undesirable excessive pillowing or de-lamination of the pastry article.

In preferred embodiments, the present methods of preparation can further comprising a step of applying an icing to the top surface of the baked article. In commercial practice the icing application step is practiced immediately upon completion of the baking step and without an intermediate cooling step. Thus, the icing can be formulated to be a quick setting heat tolerant fondant composition and is especially important in soluble fiber fortified icing compositions. Typically, a packaged toaster food article includes two toaster pastry articles in a stacked orientation in a top-touching-bottom alignment. Having a quick setting formulation is important to reducing or avoiding any sticking of the top of one toaster pastry article to the bottom of an overlaying article. Such sticking of one article to another from the icing topping is a top consumer complaint.

The articles can be packaged in suitable consumer food packaging. Typically, one, or preferably two stacked, toaster pastry articles are disposed within a sealed pouch fabricated from a high moisture barrier flexible packing film. One or several such packets can then be packaged within a protective container such as a cardboard carton for distribution and sale.

The resultant multi-layered toaster product can be stored, distributed, and sold in a shelf-stable, refrigerated or frozen format. In preferred form wherein the articles are formulated and manufactured to have a combined water activity of 0.70 or less, the articles are shelf stable for extended times (e.g., up to one year) at room temperatures.

The present soluble fiber fortified articles can be used by the consumer in conventional manner. The articles can be consumed without warming. However, in preferred usage, the articles are warmed by heating in a conventional toaster home appliance. In certain variations, the articles can be warmed by microwave heating to refresh the products for consumption. The completed product has a structural integrity that provides a tender texture that withstands heating such that the multiple layers do not separate and the product does not break into pieces after heating. The structural integrity of the product is such that it can be held by hand without breaking. The product has a pleasing taste and mouth-feel before and after eating. After toasting, surprisingly, the products organoleptic properties are similar to conventional low fiber level article notwithstanding the high levels of added fiber fortification. Such an invisibility feature to the high fiber level is especially important in articles intended by parent for consumption by their children who can be particularly obdurate about consuming high fiber foods.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A shelf stable high fiber toaster pastry comprising:
   A. a baked chemically leavened soluble fiber fortified pastry dough planar shell formed from two opposed similarly sized baked leavened first and second layers spaced slightly apart and sealed together along their adjoining free edges or peripheral margins forming an interior pocket, said dough including:
  whole grain wheat flour, salt, chemical leavening, shortening, and 1-15% added solid powdered polydextrose, said dough having a total fiber content of at least 5%;
  wherein at least a portion of the chemical, leavening is provided by ammonium carbonate to provide a specific baked volume of 1.5 cc/g or greater;
  wherein the baked dough water activity is 0.70 or less;
B. a soluble fiber fortified filling disposed within the interior pocket formed by the shell between said first layer and said second layer, said filling comprising a liquid soluble fiber source selected from the group consisting of inulin, polydextrose, hydrolyzed guar gum and mixtures thereof, the filling having a soluble fiber content of at least 8%, wherein the filling has a water activity of 0.70 or less, and a weight ratio of shell to filling ranges from 1.5:1 to 2.5:1.

2. The toaster pastry of claim 1 wherein the solid powdered polydextrose is added to the dough to provide a total fiber content of the dough of at least 8%.

3. The toaster pastry of claim 2 wherein at least a majority of the whole grain wheat flour is provided by a hard white spring wheat flour.

4. The toaster pastry of claim 1 wherein the liquid soluble fiber of the filling layer is polydextrose.

5. The toaster pastry of claim 4 wherein each of the first and second layers of the dough has a thickness of 1-5 mm, the filling has a thickness of 1-4 mm, and the first layer includes a top major surface and a multiplicity of docking holes.

6. The toaster pastry of claim 5 additionally comprising a topical icing layer applied to the top major surface of the first layer and overlaying at least a majority of the docking holes.

7. The toaster pastry of claim 6 wherein the icing layer includes liquid polydextrose to provide the icing layer with a soluble fiber content of 10% or greater.

8. A method of preparing a toaster pastry, comprising the steps of:
  forming a continuous layer of sheeted dough fabricated from a chemically leavened dough having ammonium bicarbonate as a leavening agent and a solid soluble fiber ingredient including polydextrose to provide the dough with a total fiber content of 8% or greater, said dough having a moisture content of 10-20% and a water activity of 0.85 or less;
  applying or depositing a filling layer onto an interior portion or half of the dough layer to form a filled dough layer portion and an unfilled dough layer portion, said filling layer comprising liquid soluble fiber to provide the filling with a soluble fiber content of 1-35% and having a viscosity during application of 14,000 cps or less and having a water activity of about 0.75 or less;
  folding the unfilled dough layer portion over the filled dough layer portion to form matched and aligned upper and lower dough layers shell portions forming a dough shell having an inner pocket with the filling layer disposed within the inner pocket, said shell having open free edges;
  sealing the open free edges of the shell to form an encasing dough pie shell;
  providing a multiplicity of docking holes in the upper dough layer shell portion for moisture escape during baking; and,
  baking the pie shell to form a finished, high fiber expanded toaster pastry.

9. The method of claim 8 wherein the solid soluble fiber ingredient, in addition to the polydextrose, includes further fiber ingredients selected from the group consisting of maltodextrins, inulin, guar gum, carbomethyl cellulose, high methoxy pectin, and mixtures thereof.

10. The method of claim 8 wherein the solid soluble fiber ingredient is comprised entirely of polydextrose.

11. The method of claim 8, additionally comprising the step of: applying an icing to the upper dough layer shell portion after baking.

12. The method of claim 11 wherein the step of providing a multiplicity of docking holes in the upper dough layer shell portion is practiced before the folding step.

13. The method of claim 12 wherein the step of applying an icing is practiced such as to overlay the icing over at least a majority of the docking holes and wherein the icing includes a soluble fiber ingredient.

14. The method of claim 13 wherein the soluble fiber ingredient in the icing comprises liquid polydextrose.

15. The method of claim 14 wherein the pie shell is in planar form and wherein the dough comprises a whole grain wheat flour.

16. The method of claim 15 wherein at least a majority of the whole grain wheat flour is a white wheat flour.

17. The method of claim 16 wherein the toaster pastry is provided with a total fiber content of 10% or greater.

18. The method of claim 17 wherein the baking step is practiced to provide the toaster pastry with a water activity value of 0.67 or less.

19. The method of claim 18 additionally comprising the step of
  disposing the toaster pastry within a pouch fabricated from a moisture barrier flexible packaging film.

20. A shelf stable, high fiber toaster pastry comprising:
  A. a baked, chemically leavened, soluble fiber fortified planar pastry dough shell formed from two opposed similarly sized baked leavened first and second dough layers spaced slightly apart and sealed together, along their peripheral edge portions forming an interior pocket, said dough including whole grain wheat flour, salt, chemical leavening, shortening, and solid powdered polydextrose, wherein at least a portion of the chemical leavening is provided by ammonium carbonate;
  B. a soluble fiber fortified filling disposed, within the interior pocket formed by the shell between the first layer and the second layer, said filling including a liquid soluble fiber; and
  C. a soluble fiber fortified topical icing layer applied atop the pastry dough shell, with the icing-layer including a liquid soluble fiber.

21. The toaster pastry of claim 20, wherein the liquid soluble fiber of each of the filling and the icing layer constitutes polydextrose.

* * * * *